US010564274B2

(12) United States Patent
Delos et al.

(10) Patent No.: US 10,564,274 B2
(45) Date of Patent: Feb. 18, 2020

(54) PHASE OR DELAY CONTROL IN MULTI-CHANNEL RF APPLICATIONS

(71) Applicant: ANALOG DEVICES, INC., Norwood, MA (US)

(72) Inventors: Peter Ladd Delos, Greensboro, NC (US); Jarrett Lee Liner, High Point, NC (US)

(73) Assignee: ANALOG DEVICES, INC., Norwood, MA (US)

( * ) Notice: Subject to any disclaimer, the term of this patent is extended or adjusted under 35 U.S.C. 154(b) by 319 days.

(21) Appl. No.: 15/695,300

(22) Filed: Sep. 5, 2017

(65) Prior Publication Data

US 2019/0072657 A1    Mar. 7, 2019

(51) Int. Cl.
  *G01S 13/32*  (2006.01)
  *H01Q 3/26*  (2006.01)

(52) U.S. Cl.
  CPC ........... *G01S 13/32* (2013.01); *H01Q 3/2682* (2013.01)

(58) Field of Classification Search
  CPC ....... G01S 13/32; G01S 13/34; H01Q 3/2682; H01Q 3/2694; H01Q 3/30; H01Q 3/34; H01Q 3/38
  See application file for complete search history.

(56) References Cited

U.S. PATENT DOCUMENTS

| 2008/0106339 A1* | 5/2008 | Adlerstein | H01Q 3/30 331/2 |
| 2008/0180324 A1* | 7/2008 | Floyd | H01Q 3/30 342/372 |
| 2009/0128204 A1* | 5/2009 | Lim | H01Q 3/30 327/157 |
| 2011/0063169 A1* | 3/2011 | Chen | H01Q 3/267 342/368 |
| 2012/0154203 A1* | 6/2012 | Vacanti | G01S 7/03 342/149 |
| 2014/0097986 A1* | 4/2014 | Xue | H01Q 3/34 342/372 |
| 2017/0090015 A1* | 3/2017 | Breen | G01S 7/4004 |
| 2018/0011180 A1* | 1/2018 | Warnick | H01Q 3/34 |
| 2019/0013814 A1* | 1/2019 | Thuries | H03H 11/20 |
| 2019/0072657 A1* | 3/2019 | Delos | H01Q 3/2682 |

* cited by examiner

*Primary Examiner* — Peter M Bythrow
(74) *Attorney, Agent, or Firm* — Knobbe, Martens, Olson & Bear, LLP (57) ABSTRACT

Systems and methods for controlling phase or delay in multi-channel radio frequency applications. The system includes a local oscillator, a frequency generator, a clock buffer, a plurality of mixers and a plurality of filters. The frequency generator generates an intermediate frequency output signal which can be received by the clock buffer. The clock buffer creates multiple phase-adjusted reference frequency signals that are each different in phase. A local oscillator generates a plurality of local oscillator signals having the same frequency and phase. A plurality of mixers produce a plurality of RF signals based at least in part on the plurality of local oscillator signals and the plurality of phase-shifted reference frequency signals.

20 Claims, 8 Drawing Sheets

PHASE OR DELAY CONTROL IN MULTI-CHANNEL RF APPLICATIONS

FIELD

The present disclosure relates generally to phased array radar, and more particularly, to utilizing a clock buffer for phase or delay control in multi-channel radio frequency (RF) applications.

BACKGROUND

Beam forming is a signal processing technique used in antenna arrays for directional signal transmission or reception.

BRIEF DESCRIPTION OF THE DRAWINGS

These drawings and the associated description herein are provided to illustrate specific embodiments and are not intended to be limiting.

DETAILED DESCRIPTION

Figure 1:
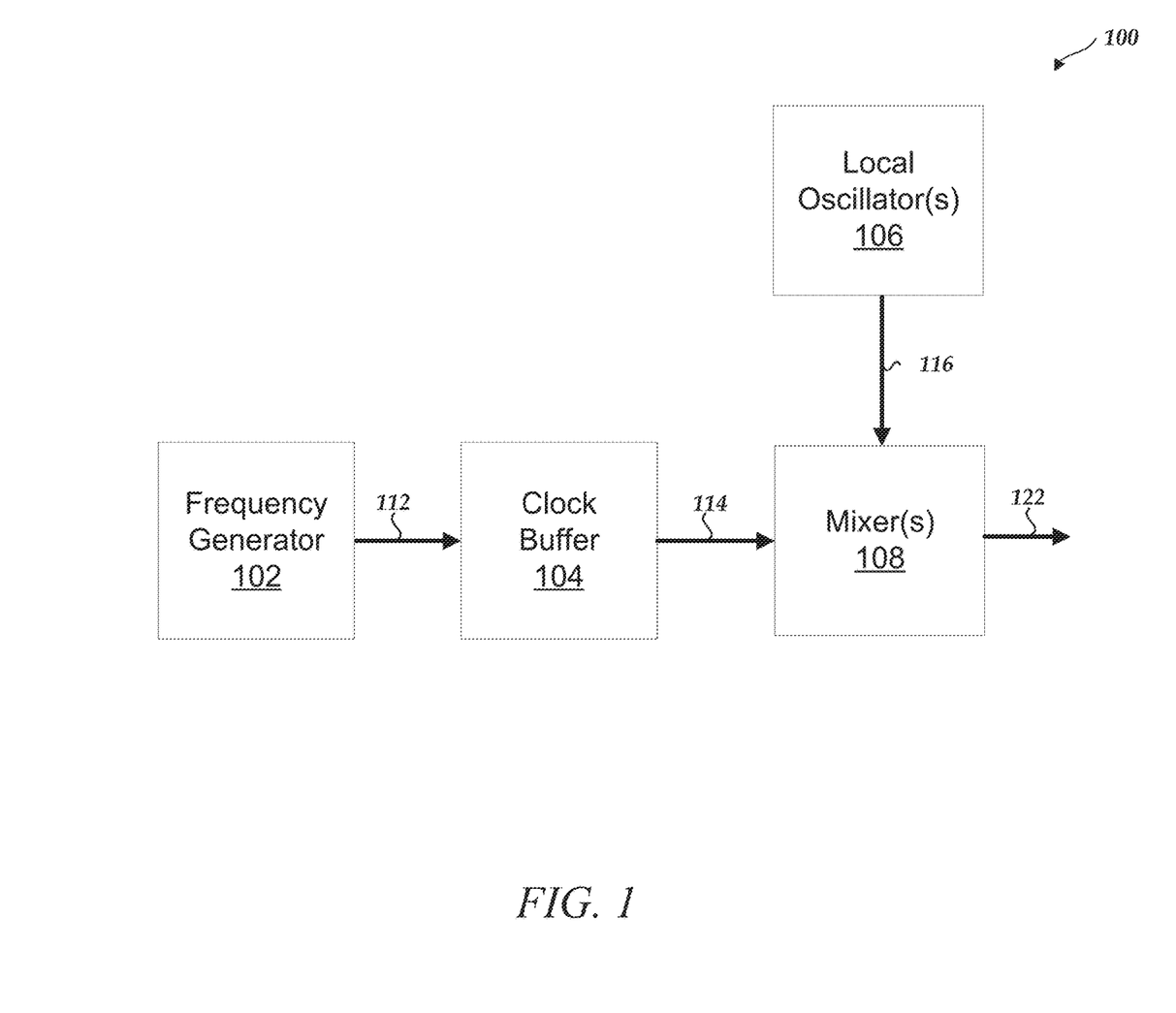
FIG. 1 is a block diagram illustrative of an embodiment of a multi-channel system using a clock buffer circuit for phase control.

Beam forming is a signal processing technique used in antenna arrays for directional signal transmission or reception. Digital beam forming may permit fine delay control in RF applications but may require higher-end integrated circuits, such as field-programmable gate arrays (FPGAs) or application-specific integrated circuits (ASICs), which may be expensive or power intensive. Analog beam forming is less expensive or power intensive than digital beam forming but analog beam forming does not allow for fine delay adjustments. A multi-channel RF system is disclosed which is cost-effective and allows for fine delay control in RF applications requiring phase shifts across multiple channels.
Phase Control on the Data Signal Path FIG. 1 is a block diagram illustrative of an embodiment of a multi-channel system 100 using a clock buffer circuit 104 for phase control. As described herein, rather than including a phase shifter on each radiating element of a phased array (not shown), the system 100 can exploit features of the clock buffer circuit 104 to provide phase or delay control on the data signal path before signals are mixed by the mixer.

The system 100 may include a frequency generator 102, a clock buffer circuit 104, a local oscillator (LO) 106, and one or more mixers 108. The frequency generator 102 generates a reference frequency signal 112. The clock buffer 104 receives the reference frequency signal 112 and generates a plurality of phase-adjusted reference frequency signals 114 that are each different in phase. The LO 106 (212a) cangenerate LO signals 116. Each of the mixers 108 produces a radio frequency (RF) signal by up-converting one of the phase-adjusted reference frequency signals 114 using one of the LO signals 116. The outputs 122 of the mixers 108 may then be added to generate a beam having a direction corresponding to the phase adjustments of the clock buffer circuit 104.

The frequency generator 102 may be an electronic device that generates repeating or non-repeating electronic signals in either the analog or the digital domain. The frequency generator 102 may produce reference frequency signal(s) 112 having a radio frequency, such as frequencies that lie in the range extending from about 3 kHz to about 300 GHz. In some cases, the frequency generator 102 may produce a reference frequency signal(s) 112 having an intermediate frequency (IF), such as a frequency that lies in the range extending from about 500 MHz to about 3 GHz. In some cases, the frequency generator 102 may produce a reference frequency signal(s) 112 having a frequency that lies in the range extending from about 200 MHz to about 6 GHz. For example, the frequency generator 102 may produce a reference frequency signal(s) 112 having a frequency of about 100, 200, 300, 400, 500, 600, 700, 800, or 900 MHz (+/− about 30 MHz). In addition or alternatively, the frequency generator 102 may produce a reference frequency signal(s) 112 having a frequency of about 1, 1.5, 2, 2.5, 3, 3.5, 4, 4.5, or 5 GHz (+/− about 0.15 GHz). In some embodiments, the frequency generator 102 may produce a reference frequency signal(s) 112 having a frequency of approximately 10% to 30% of the frequency of the LO signals 116 generated by the LO 106 (212a). However, it will be understood that frequency generator 102 can be configured to produce a reference frequency signal 112 of any frequency as desired.

In some embodiments, the frequency generator 102 can be configured to output (non-limiting example: responsive to user input) any frequency within the frequency range of the frequency generator 102. In some cases, the frequency generator 102 may offer various types of modulation, such as frequency modulation (FM), phase modulation (PM), pulse modulation, and the like.

The clock buffer circuit 104 includes at least one input channel and a plurality of output channels and is configured to provide independent phase and/or frequency management of each of its output channels. For example, the clock buffer 104 receives an input signal and creates copies of the input signal to distribute at its output channels. The clock buffer 104 can perform a phase and/or frequency adjustment on each of the copies of the input signal such that each of the output signals of the clock buffer matches the input signal, save for an adjustment in phase and/or frequency.

The independent phase management of each of the output channels can ensure that each of the output signals of the clock buffer is out of phase with respect to the other output signals. For example, a first signal of the output signals 114 of the clock buffer 104 can have a phase $\Phi_1$, a second signal of the output signals 114 of the clock buffer 104 can have a phase $2*\Phi_1$, a third signal of the output signals 114 of the clock buffer 104 can have a phase $3*\Phi_1$, and so on. In some embodiments, the phase $\Phi_1$ of the first output signal of the clock buffer 102 can be random, and can be anywhere from between 0 to $2\pi$ radians, or 0° to 360°. In some embodiments, the phase of each of the output signals is random, and can be anywhere from between 0 to $2\pi$ radians, or 0° to 360°.

In some cases, the clock buffer 104 allows for course and/or fine delay adjustments of the output signals. For example, the clock buffer 104 can allow for course and/or fine delay adjustments in the analog domain, rather than the digital domain. A course delay may allow for a step size of about 170 ps and a delay range from about 0 to 8 periods of the input frequency. In addition, fine delay may allow for a nominal step size (e.g., about 26 ps) and range from about 0 to 700 ps of total delay. Accordingly, the delay step and the fine delay step of the clock buffer 104 can allow for both large dynamic range and high resolution. In some cases, the phase of each output signal of the clock buffer circuit 104 is adjusted such that no output signal has the same phase. However, it should be noted that, in some cases, one or more output signals may have the same phase.

The clock buffer 104 may have any number of output channels from which it can output a phase and/or frequency adjusted signal. For example, the clock buffer 104 may have tens, hundreds, or thousands of output channels. In some cases, the clock buffer 104 may have less than 10 output channels, such as 6 or 8 output channels. In some cases, the clock buffer 104 may have about 10, 14, 16, 32, or more output channels. In some embodiments, multiple clock buffer circuits 104 can by utilized together to increase a number of available output channels. For example, one or more additional clock buffer circuits may be connected to an input of output of clock buffer 104 such that the number of available phase shifted outputs may reach up to 10s or 100s of outputs.

The LO 106 may be an electronic circuit that produces a periodic, oscillating electronic signal, such as a sine wave or a square wave. In some cases, the LO 106 may be configured to generate an electrical signal having a precise frequency and/or phase. For example, the LO 106 may produce LO signal(s) 116 having a precise frequency, such as a frequency that lies in the range extending from about 100 kHz to about 100 GHz. In some cases, the LO signal(s) 116 have a frequency of about 2, 5, 8, 10, 12, or 20 GHz (+/− about 1.5 GHz). The LO 106 may be a variable-frequency oscillator in that it can be tuned to different frequencies.

The mixer(s) 108 receive input from the LO 106 and the clock buffer 104 and generate a plurality of mixed RF signals. For example, each of the mixers 108 may up-convert a phase-adjusted reference frequency signal 114 by mixing it with a LO signal 116. Such mixing can produce a plurality of RF signals 122.

In some cases, the mixer(s) 108 are electronically connected to an array antenna, which creates a beam of radio waves that can be electronically steered (e.g., based on the phase-adjustment performed by the clock buffer 104) to point in different directions. For example, the phase of the mixed RF signals 112 corresponds to the phase of the phase-adjusted reference frequency signals 114 which phase-adjusted by the clock buffer circuit 104. Accordingly, by altering the phase(s) of the reference frequency signal 112, the system 100 can steer the beam of radio waves to a different direction. For example, based on the phase relationship, the radio waves from the separate antennas can add together to increase the radiation in a desired direction, while cancelling to suppress radiation in undesired directions.

In some cases, the outputs of the mixers 108 are also electrically coupled to a filter which serves to filter out a undesired signals. For example, the mixer(s) 108 may produce the sum and difference of the frequency of the LO signals 116 and frequency of the phase-adjusted reference frequency signals 114 (e.g., LO+IF, LO−IF, or IF−LO). In this context, the filter, such as a bandpass filter, can serve to filter or remove the lower sideband (non-limiting example: remove the difference frequencies (LO−IF or IF−LO) component) by filtering the output of the mixers 108 before providing it to an antenna element.

In addition or alternatively, the outputs of the mixers 108 can be electrically coupled to an amplifier which serves to amplify a signal, such as a signal provided by the filter. Additional filters can be included in the system 100, which can serve to filter an output of an amplifier or provide an RF signal to an input of an antenna.

Figure 2:
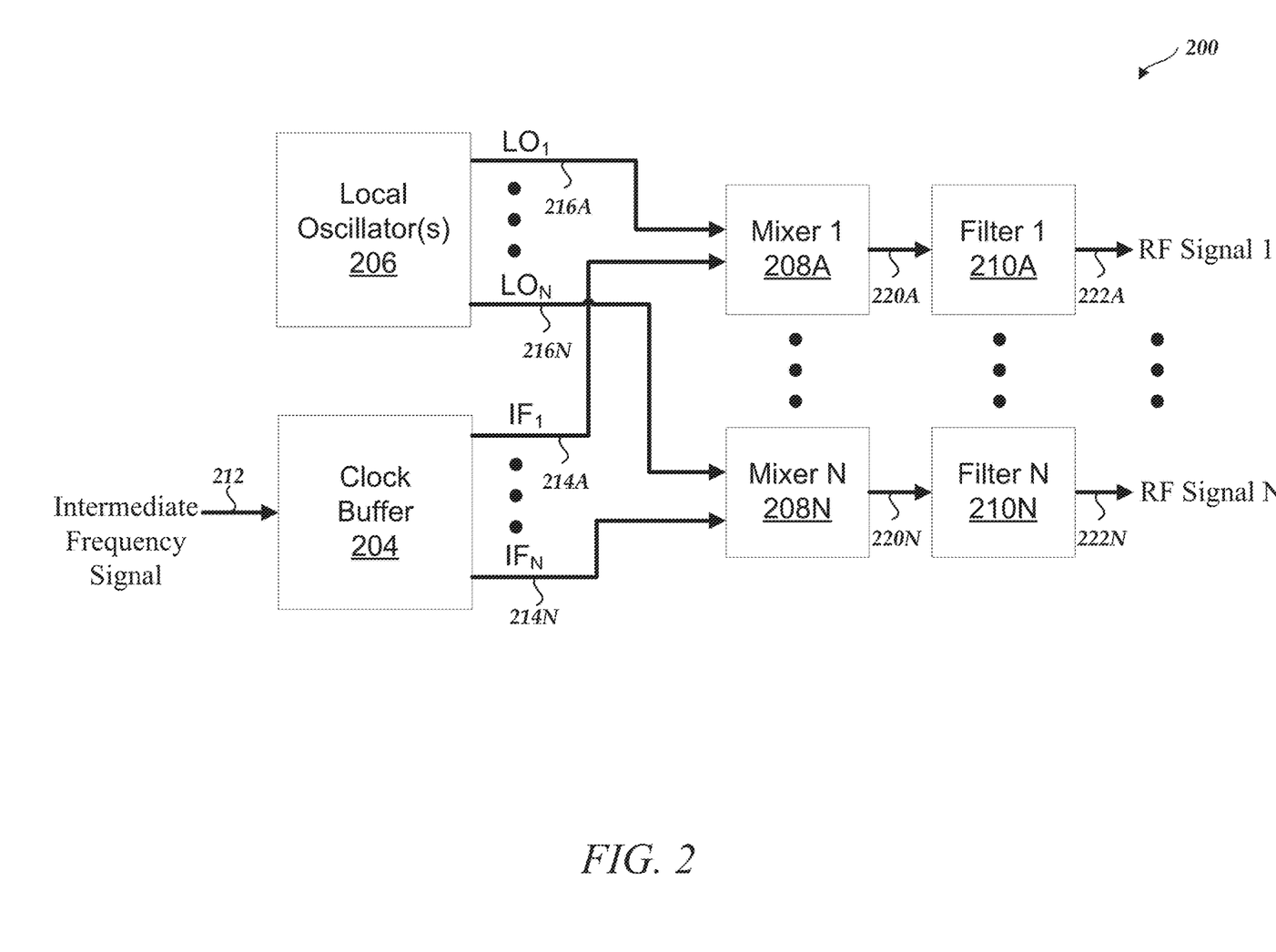
FIG. 2 is a block diagram illustrative of an embodiment of a multi-channel system using a clock buffer circuit for phase control.

FIG. 2 is a block diagram illustrative of an embodiment of a multi-channel system 200 using a clock buffer for phase control. The system 200, which can be an embodiment of system 100, includes a clock buffer 204, a LO 206, mixers 208A-208N, and filters 210A-210N. The clock buffer 204 receives an IF signal and generates a plurality of phase-adjusted IF signals 214A-214N. The LO 206 (212a) can generate a plurality of LO signals 216A-216N. The mixers 208A-208N receive the phase-adjusted IF signals 214A-214N and the LO signals 216A-216N and produce a plurality of RF signals 220A-220N. The filters 210A-210N filter the RF signals 220A-220N to produce filtered RF signals 222A-222N.

Similar to the clock buffer 104 of FIG. 1, the clock buffer 204 includes at least one input channel and a plurality of output channels, and is configured to provide independent phase and/or frequency management of each of its output channels. For example, the clock buffer 204 can receive an input signal can create copies of the input signal to distribute at its output channels. The clock buffer 204 can perform a phase and/or frequency adjustment on each of the copies of the input signal such that each of the output signals of the clock buffer matches the input signal, save for an adjustment in phase and/or frequency.

The clock buffer 204 receives an IF signal 212 as its input. The IF signal 212 may be generated by a frequency generator, such as the frequency generator 102 of FIG. 1. As described herein, the IF signal 212 may have a frequency that lies in the range extending from about 500 MHz to about 3 GHz. For example, the IF signal 212 may have a frequency of about 1, 1.5, 2, 2.5, or 3 GHz (+/− about 0.15 GHz). However, it will be understood that the IF signal 212 can have any frequency as desired.

Similar to the LO 106 of FIG. 1, the LO 206 may be an electronic circuit that produces a periodic, oscillating electronic signal, such as a sine wave or a square wave. In some cases, the LO 206 may be configured to generate an electrical signal having a precise frequency and/or phase. For example, the LO 206 may produce LO signals 216A-216N having a precise frequency, such as a frequency that lies in the range extending from about 100 kHz to about 100 GHz, or some other frequency as desired.

The mixers 208A-208N, which can be an embodiment of the mixer(s) 108 of FIG. 1, may receive input from the LO 206 and the clock buffer 204 and may generate a plurality of mixed radio frequency signals 220A-220N. For example, mixer 208A may up-convert the phase-adjusted IF signal 214A by mixing it with the LO signal 216A. Similarly, mixer 208N may up-convert the phase-adjusted IF signal 214N by mixing it with the LO signal 216N. Such mixing can produce a plurality of RF signals 220A-220N. For example, mixer 208A can produce RF signal 220A, mixer 208B (not shown) can produce RF signal 220B (not shown)—and mixer 208N can produce RF signal 220N. It should be noted that any number of IF signals, LO signals, and/or mixers may be utilized.

The outputs of the mixers 208A-208N may be electrically coupled to filters 210A-210N which serve to filter out a desired frequency range. For example, as described herein, the mixers 208A-208N may produce the sum and difference frequencies (e.g., LO+IF, LO−IF, IF−LO) from the frequency of the LO signals 216A-216N and frequency of the phase-adjusted IF signals 214A-214N. In this context, the filters 210A-210N can act as a bandpass or high pass filter to remove the lower sideband of the mixed frequency signals 220A-220N.

In some cases, the filters 210A-210N are electronically connected to an array antenna, which creates a beam of radio waves that can be electronically steered (e.g., based on the phase-adjustment performed by the clock buffer 204) to point in different directions. For example, the phase of filtered RF radio frequency signals 222A-222N corresponds to the phase of the phase-adjusted IF signals 214A-214N. Accordingly, by altering the phase(s) of the phase-adjusted IF signals 214A-214N, the system 200 can steer the beam of radio waves to a different direction.

In addition or alternatively, the outputs of the filters 210A-210N can be electrically coupled to an amplifier which serves to amplify the filtered RF radio frequency signals 222A-222N. Additional filters can be included in the system 200 as well, which can serve to filter an output of an amplifier.

Figure 3:
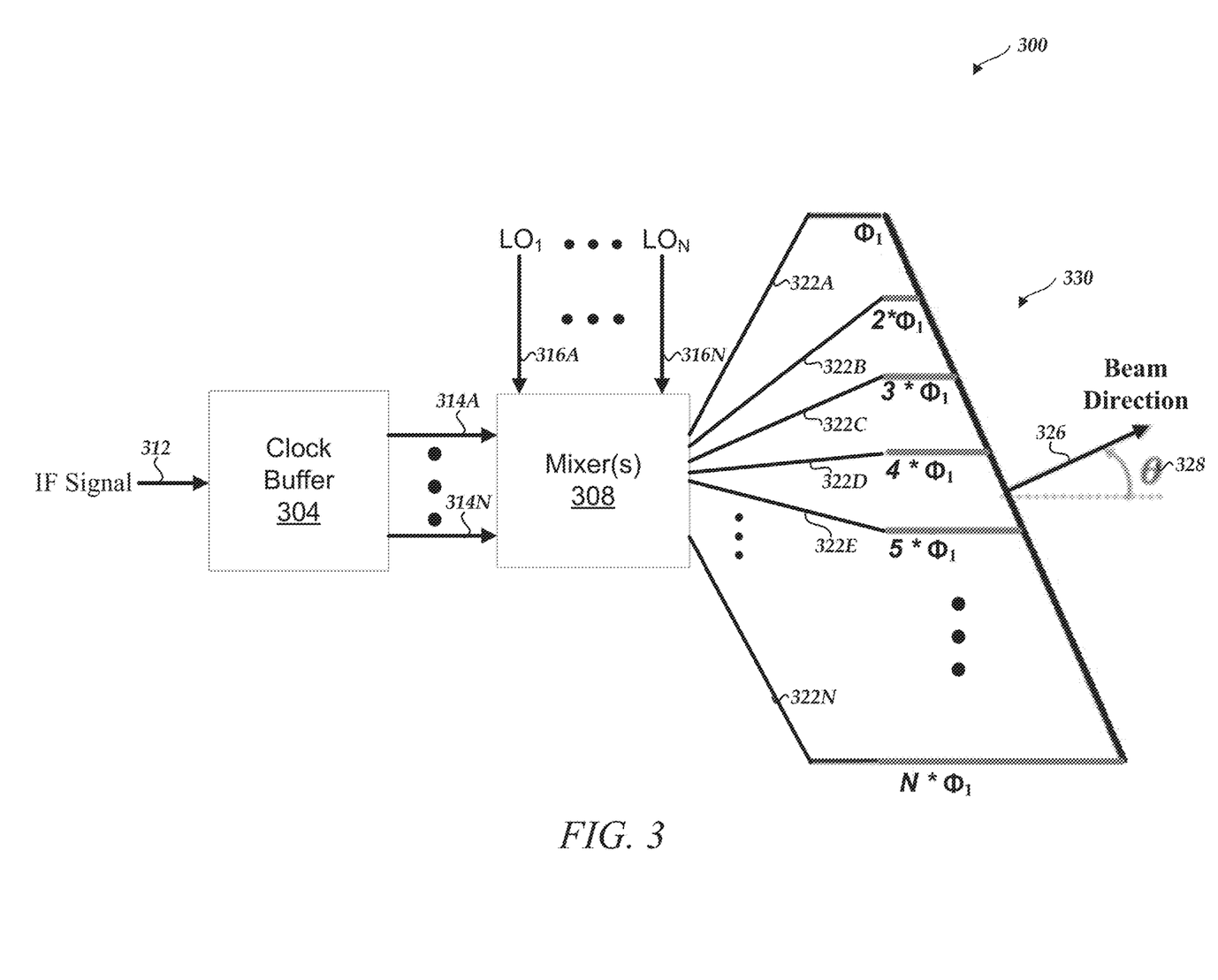
FIG. 3 is a block diagram illustrative of an embodiment of a multi-channel system using a clock buffer for RF beam steering.

FIG. 3 is a block diagram illustrative of an embodiment of a multi-channel system 300 using a clock buffer 304 for RF beam steering. The system 300, which can be an embodiment of system 100, includes a clock buffer 304 and mixer(s) 308. The clock buffer 304 receives an IF signal 312 and generates a plurality of phase-adjusted IF signals 314A-314N. The mixer(s) 308 receive the phase-adjusted IF signals 314A-314N and a plurality of LO signals 316A-316N and generate a plurality of RF signals 322A, 322B, 332C, 322D, 322E-322N. The plurality of RF signals creates a beam 330 of radio waves having an angle 328 and a beam direction 326, each of which corresponds to the phase-adjustment applied by the clock buffer 304. In some cases, based on a phase-adjustment performed by the clock buffer 304, the beam 330 can be electronically steered to point in different directions.

The mixer(s) 308 can generate a plurality of RF signals 322A, 322B, 332C, 322D, 322E-322N. Each of the mixed RF signals 322A, 322B, 332C, 322D, 322E-322N may have a different phase based at least in part on the phase adjustment performed by the clock buffer 304 on the IF signal 312. For example, mixed RF signal 322A may have a phase corresponding to a phase of the phase-adjusted IF signal 314A, mixed RF signal 322B may have a phase corresponding to a phase of the phase-adjusted IF signal 314B (not shown), mixed RF signal 322N may have a phase corresponding to a phase of the phase-adjusted IF signal 314N, and so on.

As a non-limiting example, mixed RF signals 322A, 322B, 332C, 322D, 322E may have a phase of $\Phi_1$, $2*\Phi_1$, $3*\Phi_1$, $3*\Phi_1$, $4*\Phi_1$, and $5*\Phi_1$ respectively. In some embodiments, the phase $\Phi_1$ can be random, and can be anywhere from between 0 to $2\pi$ radians, or 0° to 360°. The phase of each of the mixed RF signals 322A, 322B, 332C, 322D, 322E may be linearly related, for example, each being a multiple of $\Phi_1$. Alternatively, in some embodiments, the phase $\Phi_1$-$N*\Phi_1$ of each of the mixed RF signals 322A, 322B-332N is random, and can be anywhere from between 0 to $2\pi$ radians, or 0° to 360°. To direct a beam to some target angle (θ) 328, each of the phase shifted mixed RF signals 322A, 322B, 332C, 322D, are shifted by the clock buffer 304, for instance, such that a wave front of the transmitted beam is the same phase at a plane further away from transmitters.

Figure 4:
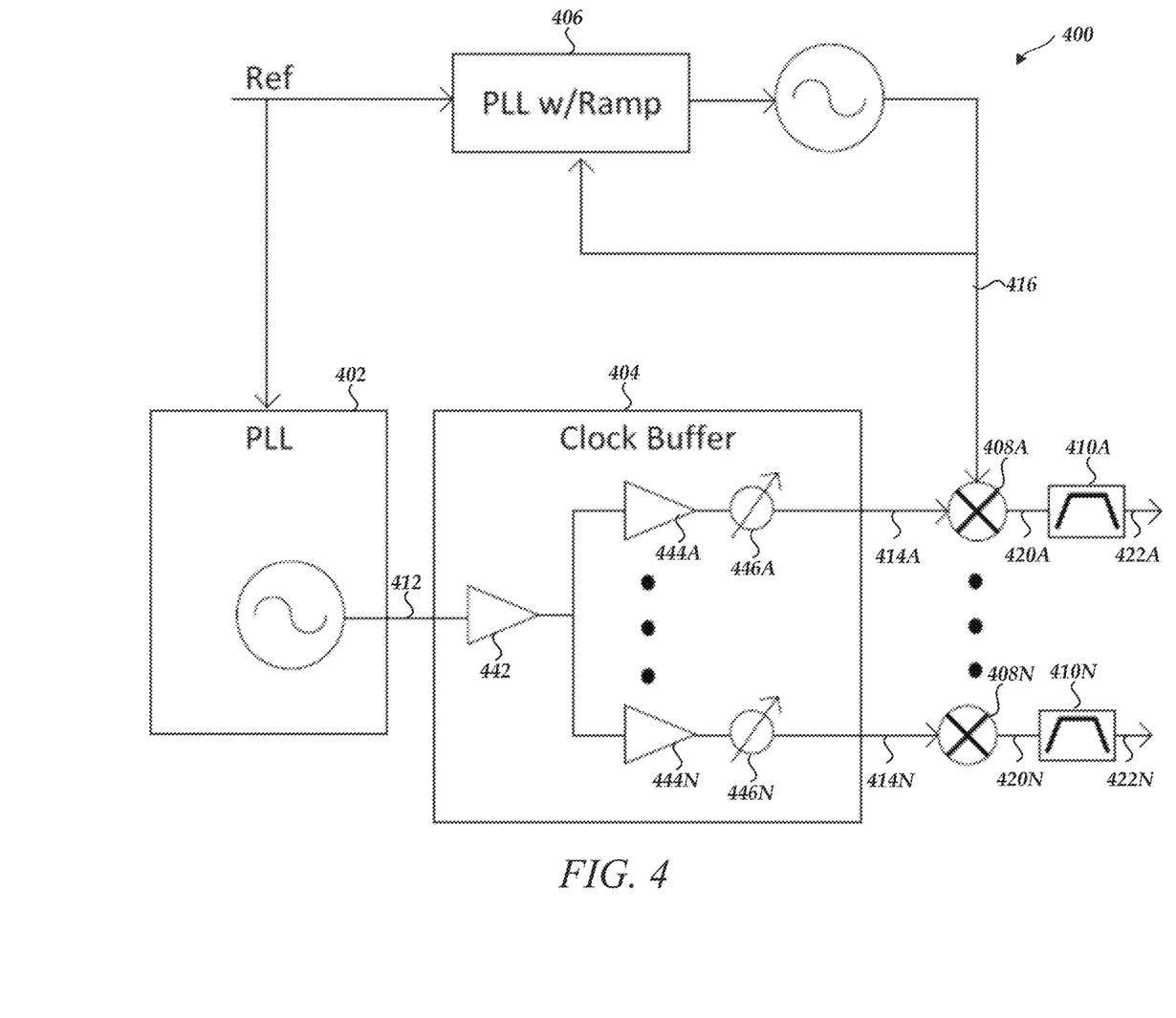
FIG. 4 is a block diagram illustrative of an embodiment of a system using a clock buffer for phase control in a Frequency-Modulated Continuous-Wave (FMCW) Radar application.

FIG. 4 is a block diagram illustrative of an embodiment of a system 400 using a clock buffer for phase control in a Frequency-Modulated Continuous-Wave (FMCW) Radar application. As illustrated, the system 400, which can be an embodiment of system 100, includes a phase locked loop (PLL) 402, a clock buffer 404, a PLL with a frequency ramp 406, mixers 408A-408N, and filters 410A-410N. The PLL 402 receives reference signal and produces a reference frequency signal having a desired frequency. The clock buffer 404 receives the reference frequency signal and generates a plurality of phase-adjusted reference frequency signals 114. The PLL with frequency ramp generates a plurality of LO signals. Each of the mixers 408A-408N generates a mixed RF signal by up-converting one of the phase-adjusted reference frequency signals using one of the LO signals. The filters 410A-410N filter the mixed RF signals 420A-420N to produce filtered RF signals 422A-422N. The clock buffer 404 can include a buffer amplifier 442 (such as a D-Flip Flop, an inventor, a MOSFET, etc.), a set of amplifiers 444A, 444N, and a set of phase shifters 446A, 446N. The set of phase shifters 446A, 446N can include, but is not limited to, one or more delays, asynchronous gates, LC phase shifters, and the like. In some cases, the clock buffer 404 can include an additional set of amplifiers at the output of the phase shifters 446A, 446N.

Non Limiting Example

As a non-limiting example, and with reference to FIG. 1, a multi-channel system 100 includes a frequency generator 102 configured to generate a reference frequency signal 112 having a frequency of 2 GHz. The reference frequency signal 112 is input into a clock buffer integrated circuit 104, such as the HMC7043 High Performance, 3.2 GHz, 14-Output Fan-out Buffer. The clock buffer 104 outputs 14 time-shifted reference frequency signals 114, each of the reference frequency signals 114 having a two degree phase shift more than the previous. The LO 106 generates a plurality of LO signals 116, each having a frequency of 10 GHz. A plurality of mixers 108 up-convert the time-shifted reference frequency signals 114 by adding the time-shifted reference frequency signals 114 to the LO signals 116. The plurality of mixers 108 output a plurality of RF signals 122.

Phase Control on the LO Path

Figure 5:
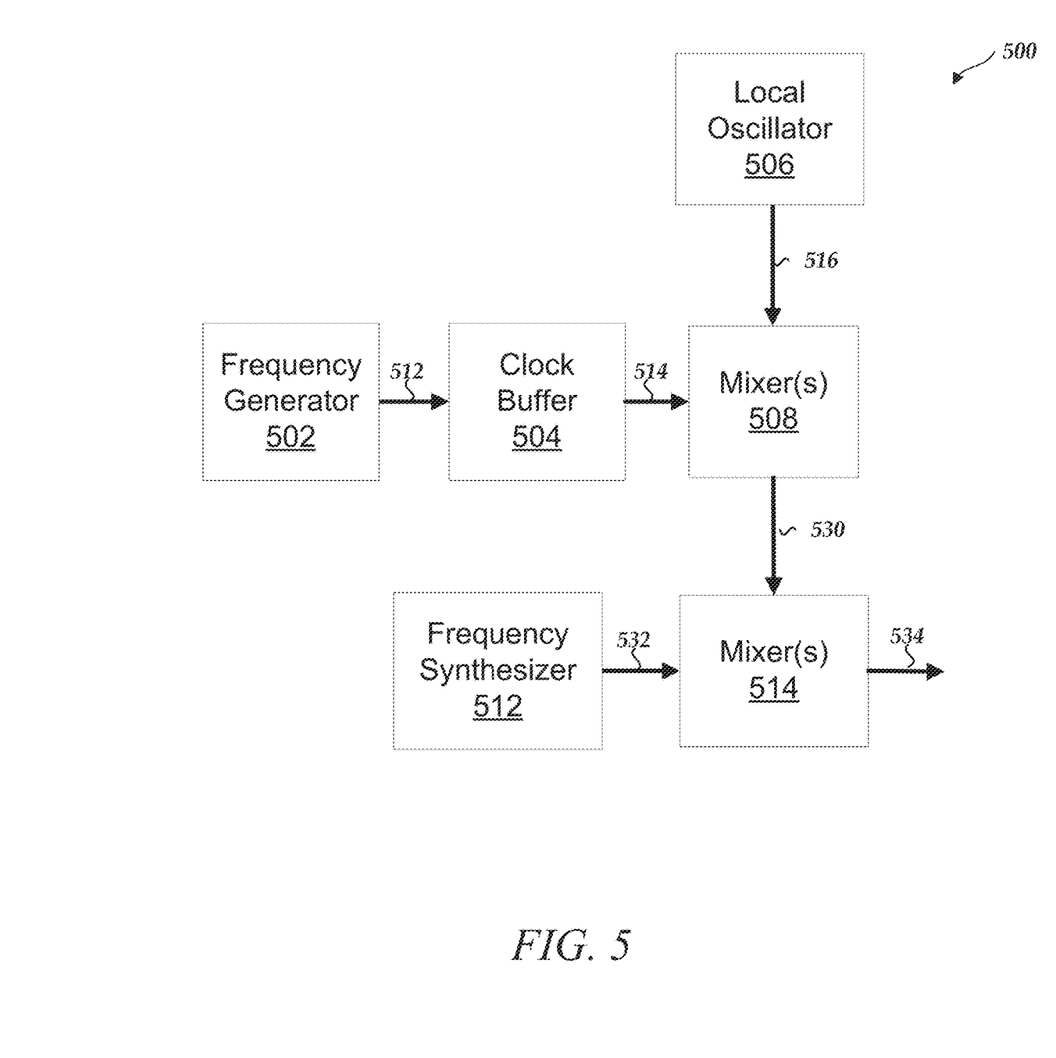
FIG. 5 is a block diagram illustrative of an embodiment of a multi-channel system using a clock buffer for phase control.

FIG. 5 is a block diagram illustrative of an embodiment of a multi-channel system 500 using a clock buffer 504 for phase control. The system 500 includes a frequency generator 502, a clock buffer 504, a LO 506, a waveform generator 512, and mixers 508, 518. The frequency generator 502 generates a reference frequency signal 512 which serves as input to the clock buffer 504. The clock buffer 504 generates a plurality of phase-adjusted reference frequency signals 514, and the LO 506 (212a) can generate a plurality of LO signals 516. The mixers 508 receive the phase-adjusted reference frequency signals 514 and the LO signals 516, and, using these signals, generate a plurality of phase-adjusted LO signals. The waveform generator 512 generates a waveform 532. The mixers 514 produce RF signals by up-converting a plurality of waveforms using the phase-adjusted LO signals. The RF signals 534 are an output of the system 500 and may be received by one or more components of a phase array.

The frequency generator 502 may be an embodiment of frequency generator 102. As described above, the frequency generator 502 may be an electronic device that generates repeating or non-repeating electronic signals in either the analog or the digital domain. The frequency generator 502 may produce a reference frequency signal 512 having a radio frequency, such as frequencies that lie in the range extending from about 3 kHz to about 300 GHz.

The clock buffer 504 may be an embodiment of clock buffer 104. As described above, the clock buffer 504 includes at least one input channel and a plurality of output channels, and is configured to provide independent phase and/or frequency management of each of its output channels. For example, the clock buffer 504 can receive an input signal can create copies of the input signal to distribute at its output channels. The clock buffer 504 can perform a phase and/or frequency adjustment on each of the copies of the input signal such that each of the output signals of the clock buffer matches the input signal, save for an adjustment in phase and/or frequency.

The first plurality of mixers 508 receives input from the LO 506, which may be an embodiment of LO 106, and the clock buffer 504. The mixers 508 can generate a plurality of phase-adjusted LO signals 522.

The waveform generator 512 generates an output waveform, for example, a sinusoidal wave, triangle wave, square wave, etc. In some cases, the waveform generator 512 is a direct digital synthesizer (DDS) which is able to synthesize waveforms with fine control over the waveform's phase, frequency, and/or amplitude. In addition, DDSs can dynamically create an output waveform having properties that are user selectable from an input clock. The waveform generator 512 may offer various types of modulation, such as amplitude modulation (AM), frequency modulation (FM), phase modulation (ΦM), pulse modulation, and the like. For example, because phase control can occur on the LO path, the path from the waveform generator 512 to the mixer(s) 514 can be linear, thereby allowing the waveform generator 512 to offer amplitude modulation.

The waveform generator 512 may produce a waveform 532 having a radio frequency, such as frequencies that lie in the range extending from about 3 kHz to about 300 GHz. In some cases, the waveform generator 512 may produce waveform 532 having an intermediate frequency (IF), such as frequencies that lie in the range extending from about 500 MHz to about 3 GHz. In some cases, the waveform generator 512 may produce a waveform 532 having a frequency that lies in the range extending from about 200 MHz to about 6 GHz. For example, the waveform generator 512 may produce a waveform 532 having a frequency of about 100, 200, 300, 400, 500, 600, 700, 800, or 900 MHz (+/− about 30 MHz). In addition, the waveform generator 512 may produce a waveform 532 having a frequency of about 1, 1.5, 2, 2.5, 3, 3.5, 4, 4.5, or 5 GHz (+/− about 0.15 GHz), or other frequency.

The second plurality of mixers 514 receives as input the phase-adjusted LO signals 530 and a plurality of waveforms corresponding to the waveform generator 512. For example, the system 500 may include a splitter (not shown) which receives the waveform as input and outputs the plurality of waveforms. The mixers 514 generate a plurality of RF signals. For example, each of the mixers 514 may up-convert a waveform by mixing it with a phase-adjusted LO signal 530. Such mixing can produce an RF signal(s) 534.

In some cases, the mixers 514 are electronically connected to an array antenna, which creates a beam of radio waves that can be electronically steered (e.g., based on the phase-adjustment performed by the clock buffer 504) to point in different directions. For example, the phase of an RF signal 534 corresponds to a phase of the phase-adjusted reference frequency signal 514 and/or the phase of the phase-adjusted LO signal. Accordingly, by altering the phase(s) of the reference frequency signal 512 using the clock buffer 504, the system 500 can steer the beam of radio waves to a different direction. For example, based on the phase relationship, the radio waves from the separate antennas can add together to increase the radiation in a desired direction, while cancelling to suppress radiation in undesired directions.

In some cases, the outputs of at least some of the mixers 508, 514 are electrically coupled to a filter which serves to filter out a desired frequency range. For example, the mixers 508, 514 may produce the sum and difference frequencies. In this context, a filter, such as a bandpass filter, can be utilized.

Figure 6:
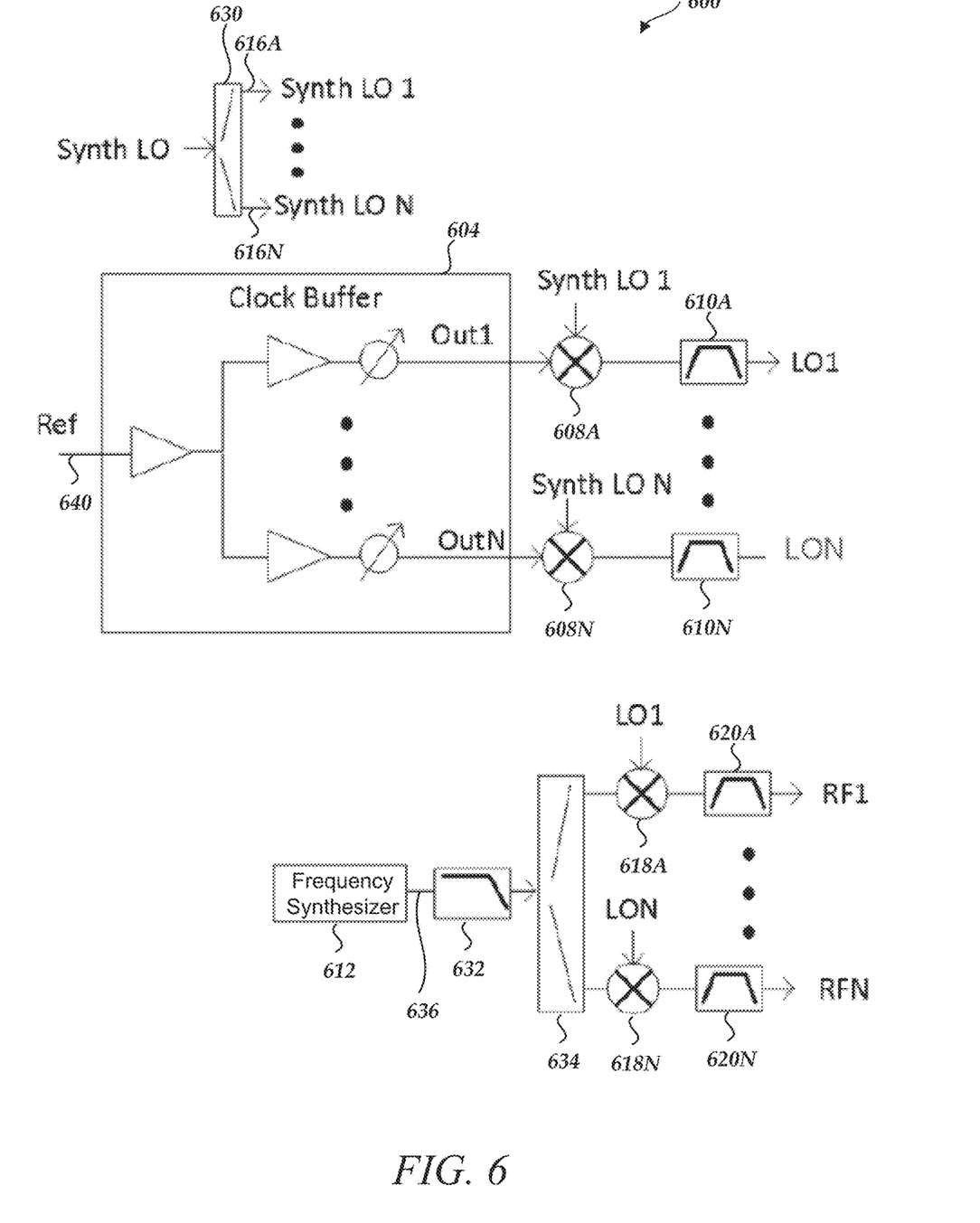
FIG. 6 is a block diagram illustrative of an embodiment of a multi-channel system using a clock buffer for phase control

FIG. 6 is a block diagram illustrative of an embodiment of a multi-channel system 600 using a clock buffer 604 for phase control. The system 600, which can be an embodiment of system 500, includes a waveform generator 612, a clock buffer 604, splitters 630, 634, mixers 608A-608N, mixers 618A-618N, filter 632, filters 610A-610N, and filters 620A-620N. The splitter 630 splits a LO signal (LO$_1$) into a plurality of LO signals 616A-616N. The clock buffer 604 receives a reference frequency signal 640 and generates a plurality of phase-adjusted reference frequency signals (Out1-OutN). Mixers 608A-608N mix the phase-adjusted reference frequency signals (Out1-OutN) and the LO signals 616A-616N to generate a plurality of phase-adjusted LO signals. Filters 610A-610N filter the plurality of phase-adjusted LO signals.

The waveform generator 612 generates a waveform 636. A filter 632 filters and a splitter 634 splits the waveform 632 to produce a plurality of waveforms. Mixers 618A-618N produce RF signals by up-converting the plurality of waveforms using the phase-adjusted LO signals. The RF signals 536 are then filtered by filters 620A-620N. The filtered RF signals (RF1-RFN) are outputs of the system 600 and may be received by one or more components of a phased array.

Flow Diagrams

Figure 7:
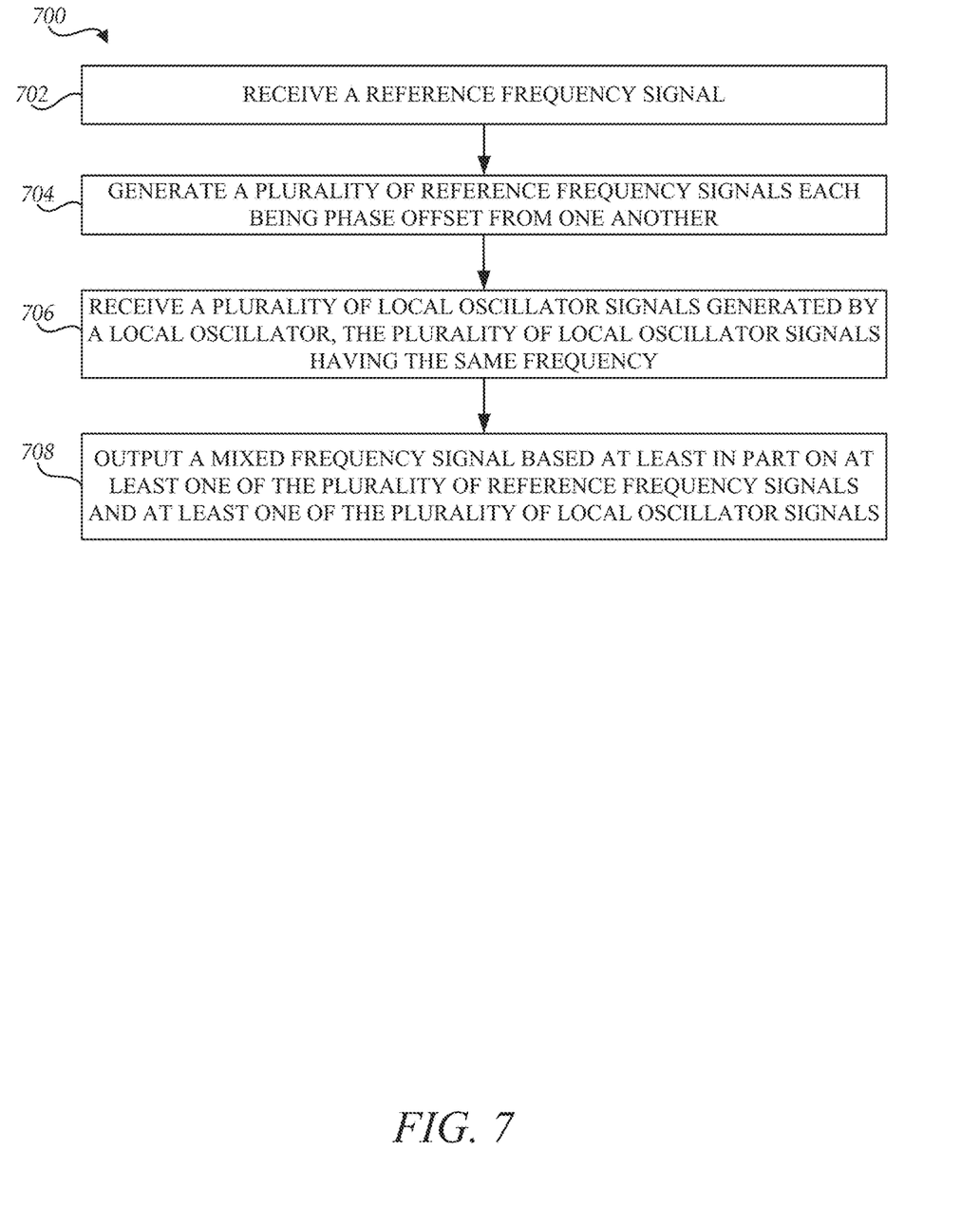
FIG. 7 is a flow diagram illustrative of an embodiment of a routine implemented by the system to generate phase modulated RF signals.

FIG. 7 is a flow diagram illustrative of an embodiment of a routine 700 implemented by a system to generate phase modulated RF signals. One skilled in the relevant art will appreciate that the elements outlined for routine 700 can be implemented by one or more computing devices or components that are associated with the system 100, such as the frequency generator 102, the clock buffer 104, the LO 106, and/or mixer(s) 108. Accordingly, routine 700 has been logically associated as being generally performed by the system 100. However, the following illustrative embodiment should not be construed as limiting. Furthermore, it will be understood that the various blocks described herein with reference to FIG. 7 can be implemented in a variety of orders. For example, the system 100 may implement some blocks concurrently or change the order, as desired. Furthermore, it will be understood that fewer, more, or different blocks can be used as part of the routine 700.

At block 702, the system 700 receives a reference frequency signal 112. For example, the frequency generator 102 can generate the reference frequency signal 112 and the clock buffer 104 can receive the reference frequency signal 112 as an input. As described herein, the reference frequency signal 112 can have any of a wide range of frequencies, such as a frequency that lies in the range extending from about 3 kHz to about 300 GHz. In some cases, the reference frequency signal 112 may having an intermediate frequency (IF), such as a frequency that lies in the range extending from about 500 MHz to about 3 GHz. In some cases, the reference frequency signal 112 may have a frequency that lies in the range extending from about 200 MHz to about 6 GHz. For example, the reference frequency signal 112 may have a frequency of about 100, 200, 300, 400, 500, 600, 700, 800, or 900 MHz (+/− about 30 MHz), about 1, 1.5, 2, 2.5, 3, 3.5, 4, 4.5, or 5 GHz (+/− about 0.15 GHz), or some other frequency.

At block 704, the system 700 generates a plurality of phase-shifted reference frequency signals 114. The clock buffer 104 can generate the phase-shifted reference frequency signals 114 from the reference frequency signal 112. For example, the clock buffer 104 can create copies of the reference frequency signal 112 that are each different in phase. As a non-limiting example, a first phase-shifted reference frequency signal can have a phase of $\Phi_1$, a second phase-shifted reference frequency signal can have a phase of $2*\Phi_1$, a third phase-shifted reference frequency signal can have a phase of $3*\Phi_1$, and so on. In some embodiments, the phase $\Phi_1$ of the first phase-shifted reference frequency signal can be random, and can be anywhere from between 0 to $2\pi$ radians, or 0° to 360°. In some embodiments, the phase of each of the phase-shifted reference frequency signals is random, and can be anywhere from between 0 to $2\pi$ radians, or 0° to 360°. Accordingly, the clock buffer 104 can apply phase modulation before the mixer 108 receives the signals corresponding to the frequency generator 102 and the LO 106.

At block 706, the system 700 receives a plurality of LO signals. For example, one or more LO 106 can generate a plurality of LO signals 116. The LO signals 116 can each have the same frequency. For instance, the frequency of the LO signals 116 can be any of a wide range of frequencies, such as about 100 kHz to 100 GHz. In some cases, the frequency of the LO signals 116 is about 10 GHz. The mixer(s) 108 can receive the LO signals 116 as well as the phase-shifted reference frequency signals 114.

At block 708, the system 700 outputs a mixed frequency signal 122. For example, as described herein, the mixers 108 up-convert the phase-shifted signals 114 using the LO signals 116. Based on the mixing, the mixer(s) 108 generate a plurality of phase-shifted RF signals 122, which, in some embodiments, can be output to one or more elements of a phase array. Accordingly, the system 700 can be utilized for transmit beam steering.

Depending on the embodiment, certain acts, events, blocks, communications or functions identified above can be performed in a different sequence, can be added, merged, or left out altogether (non-limiting example: not all described operations or events are necessary). For example, block 706 may additionally or alternatively occur prior to or concurrently with any of events 702 or 704. In addition, in some cases, the system 700 can include addition block or events such as one or more filtering or amplifying block. For example, the mixers 108 can be electrically coupled to a filter, such as a bandpass filter, which serves to filter out a desired frequency range. In addition or alternatively, the mixers can be electrically coupled to an amplifier which serves to amplify the RF signal(s).

Figure 8:
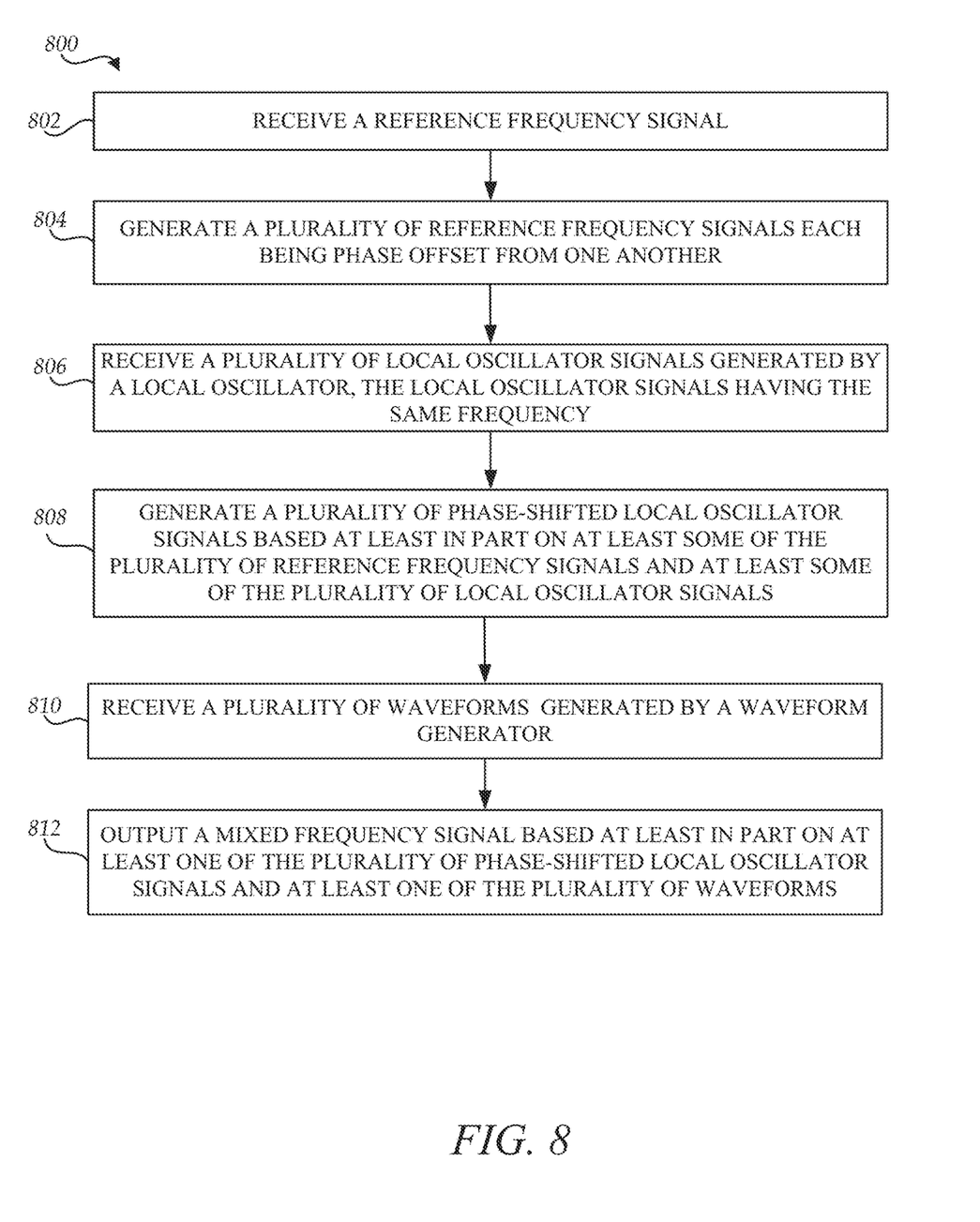
FIG. 8 is a flow diagram illustrative of an embodiment of a routine implemented by the system to generate phase, amplitude, or frequency modulated RF signals.

FIG. 8 is a flow diagram illustrative of an embodiment of a routine 800 implemented by a system to generate phase, amplitude, or frequency modulated RF signals. One skilled in the relevant art will appreciate that the elements outlined for routine 800 can be implemented by one or more computing devices or components that are associated with the system 500, such as the frequency generator 502, the clock buffer 504, the LO 506, the mixers 508, 518 and/or the waveform generator 512. Accordingly, routine 800 has been logically associated as being generally performed by the system 500. However, the following illustrative embodiment should not be construed as limiting. Furthermore, it will be understood that the various blocks described herein with reference to FIG. 8 can be implemented in a variety of orders. For example, the system 500 may implement some blocks concurrently or change the order, as desired. Furthermore, it will be understood that fewer, more, or different blocks can be used as part of the routine 800.

At block 802, similar to block 702 of FIG. 7, the process 800 receives a reference frequency signal. For example, a frequency generator can generate the reference frequency signal and a clock buffer can receive the reference frequency signal as an input. As described herein, the frequency generator can produce, or the reference frequency signal can be, any of a wide range of frequencies, such as from a few kHz to tens or hundreds of GHz. In some cases, the reference frequency signal is an intermediate frequency (IF), such as approximately 1, 2, or 3 GHz.

At block 804, similar to block 604, the process 800 generates a plurality of phase-shifted reference frequency signals. For example, a clock buffer can generate a plurality of phase-adjusted reference frequency signals from the reference frequency signal received at block 802. In some cases, the clock buffer creates a plurality of copies of the reference frequency signal and then shifts or otherwise modifies the phase of the plurality of copies such that each copy is phase offset from every other copy. Thus, the clock buffer receives a reference frequency signals and generates or outputs a plurality of phase-shifted reference frequency signals.

The phase-shifted reference frequency signal outputs of the clock buffer are out of phase with respect to each other. For example, a first phase-shifted reference frequency signal can have a phase of $\Phi_1$, a second phase-shifted reference frequency signal can have a phase of $2*\Phi_1$, a third phase-shifted reference frequency signal can have a phase of $3*\Phi_1$, and so on. In some embodiments, the phase $\Phi_1$ of the first phase-shifted reference frequency signal can be random, and can be anywhere from between 0 to $2\pi$ radians, or 0° to 360°. In some embodiments, the phase of each of the phase-shifted reference frequency signals is random, and can be anywhere from between 0 to $2\pi$ radians, or 0° to 360°.

At block 806, similar to block 706, the process 800 receives a plurality of LO signals 516. For example, one or more LO 506 can generate a plurality of LO signals 516 having the same frequency and phase. In this context, each of the LO signals 516 can maintain the same frequency and phase component. As described herein, the LO 506 can generate a plurality of signals which can have any of a wide range of frequencies, such as about 100 kHz to 100 GHz. In some cases, each of the plurality of LO signals 516 have a frequency of approximately 3 GHz to 12 GHz.

At block 808, the process 800 generates a plurality of phase-shifted LO signals 530. For example, the multi-channel system can include a plurality of mixers 508. Each mixer can receive at its input one of the phase-shifted reference frequency signals 514 and one of the LO signals 516. The mixers 508 produce a plurality of phase-shifted LO signals 530. In some cases, the multi-channel system 500 can further include one or more filters and/or amplifiers, so as to filter or amplify the phase-shifted LO signals 530.

At block 810, the process 800 receives a plurality of waveforms 532. For example, the plurality of waveforms can be generated by a waveform generator, such as a direct digital synthesizer (DDS). The waveform generator can create an output waveform which can have various selectable properties. In some cases, the waveform generator enables the dynamic adjustment of phase, amplitude modulation, pulse-width modulation, and pattern generation of the output waveform. The waveform generator can generate a sinusoidal wave, triangle wave, square wave, etc., from, for instance, a square wave input clock.

At block 812, the process 800 outputs a plurality of RF signals 534. For example, the system 500 can include a plurality of mixers 514. Each mixer can receive at its input one of the phase-shifted LO signals 530 and one of the waveforms 532. The mixers up-convert the waveforms 532 using the phase-shifted LO signals 530, thereby creating a plurality of phase-shifted RF signal(s) 534. In some cases, the multi-channel system can include one or more filters and/or amplifiers, so as to filter or amplify the RF signal(s) before providing them to an antenna element. For example, the mixers can be electrically coupled to a filter, such as a bandpass filter, which serves to filter out a desired frequency range. In addition or alternatively, the mixers can be electrically coupled to an amplifier which serves to amplify the RF signal(s). Accordingly, process 800 can be utilized for transmit beam steering.

Depending on the embodiment, certain acts, events, blocks, communications or functions identified above can be performed in a different sequence, can be added, merged, or left out altogether (non-limiting example: not all described operations or events are necessary). For example, block 806 may additionally or alternatively occur prior to or concurrently with any of events 802 or 804. As another example, block 810 may additionally or alternatively occur prior to or concurrently with any of events 802, 802, 806, or 808.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Likewise the term "and/or" in reference to a list of two or more items, covers all of the following interpretations of the word: any one of the items in the list, all of the items in the list, and any combination of the items in the list. Further, the term "each," as used herein, in addition to having its ordinary meaning, can mean any subset of a set of elements to which the term "each" is applied. Additionally, the words "herein," "above," "below," and words of similar import, when used in this application, refer to this application as a whole and not to any particular portions of this application.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the algorithms described herein can be performed in a different sequence, can be added, merged, or left out altogether (non-limiting example: not all are necessary for the practice of the algorithms). Moreover, in certain embodiments, operations, acts, functions, or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems and/or computing devices.

Virtualization technologies allow a single physical computing device to host one or more instances of a virtual machine, which virtual machine instance appears to a user as an independent computing device. With virtualization, the host computing device can create, maintain, delete, or otherwise manage virtual machines instances in a dynamic manner. In turn, users can request computing resources, including single computing devices or a configuration of networked computing devices, and be provided with virtual machine instances that provide the requested computing resources.

An instance of a virtual machine may be configured to provide specific functionality. For example, a virtual machine instance may be associated with different combinations of software applications and operating systems or operating system configurations to enable a virtual machine to provide different desired functionalities, or to provide similar functionalities more efficiently.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention may be recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application, in either this application or in a continuing application.

Disjunctive language such as the phrase "at least one of X, Y, or Z," unless specifically stated otherwise, is otherwise understood with the context as used in general to present that an item, term, etc., may be either X, Y, or Z, or any combination thereof (non-limiting examples: X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A multi-channel radio frequency (RF) system configured to utilize a clock buffer for phase control, the system comprising:
a clock buffer circuit configured to generate a plurality of phase-shifted reference frequency signals based at least in part on a reference frequency signal generated by a frequency generator;
a local oscillator configured to generate a plurality of local oscillator signals having the same frequency and phase; and
a plurality of mixers configured to a generate a plurality of RF signals based at least in part on the plurality of local oscillator signals and the plurality of phase-shifted reference frequency signals.

2. The system of claim 1, further comprising the frequency generator configured to generate the reference frequency signal.

3. The system of claim 1, wherein the plurality of mixers is a first plurality of mixers, and the plurality of RF signals are phase-shifted local oscillator signals, the system further comprising:
a waveform generator configured to generate a waveform signal; and
a second plurality of mixers configured to generate a plurality of RF signals based at least in part on a plurality of waveform signals and the plurality of phase-shifted local oscillator signals.

4. The system of claim 3, wherein the waveform generator is a direct digital synthesizer (DDS).

5. The system of claim 3, wherein the waveform generator is configured to apply amplitude or frequency modulation to the waveform signal.

6. The system of claim 3, further comprising a splitter configured to receive the waveform signal from the waveform generator and output the plurality of waveform signals to the second plurality of mixers.

7. The system of claim 1, further comprising a plurality of elements of a phased array configured to receive the plurality of RF signals.

8. The system of claim 1, wherein the reference frequency signal has an intermediate frequency in the range extending from about 500 MHz to 3 GHz.

9. The system of claim 1, further comprising a plurality of filters of the plurality of filters configured to output a filtered frequency signal based at least in part on a mixed frequency signal output from one of the plurality of mixers.

10. The system of claim 1, wherein each of the plurality of phase-shifted reference frequency signals has a different phase.

11. The system of claim 1, wherein each of the plurality of mixers are configured to mix a different one of the plurality of local oscillator signals and a different one of the plurality of phase-shifted reference frequency signals.

12. The system of claim 1, wherein the plurality of mixers are configured up-convert the plurality of phase-shifted reference frequency signals by adding the plurality of phase-shifted reference frequency signals to the plurality of local oscillator signals.

13. The system of claim 1, wherein frequency modulation is applied to each of the plurality of local oscillator signals.

14. A method of controlling phase in a radio frequency (RF) system using a clock buffer circuit, the method comprising:
receiving a reference frequency signal generated by a frequency generator;
generating, using a clock buffer circuit, a plurality of phase-adjusted reference frequency signals;
receiving a plurality of local oscillator signals generated by a local oscillator, the plurality of local oscillator signals having the same frequency and phase; and
generating a plurality of phase-adjusted frequency signals based at least in part on at least one of the plurality of phase-adjusted reference frequency signals and at least one of the plurality of local oscillator signals.

15. The method of claim 14, wherein each of the plurality of phase-adjusted reference frequency signals is phase offset from one another.

16. The method of claim 14, wherein the plurality of phase-adjusted frequency signals is generated using a plurality of mixers.

17. The method of claim 14, further comprising:
receiving a plurality of waveforms corresponding to a waveform generated by a waveform generator; and
generating a plurality of phase-adjusted radio frequency signals based at least in part on the plurality of phase-adjusted frequency signals and the plurality of waveforms.

18. The method of claim 17, further comprising generating the waveform using the waveform generator.

19. The method of claim 17, further comprising outputting the plurality of phase-adjusted radio frequency signals to a plurality of elements of a phased array.

20. A radar system comprising a circuit, the circuit configured to:
receive a reference frequency signal generated by a frequency generator;
generate, using a clock buffer circuit, a plurality of phase-adjusted reference frequency signals;
receive a plurality of local oscillator signals generated by a local oscillator, the plurality of local oscillator signals having the same frequency and phase; and
generate a plurality of phase-adjusted frequency signals based at least in part on at least one of the plurality of reference frequency signals and at least one of the plurality of local oscillator signals.

* * * * *